United States Patent [19]
Kurtin et al.

[11] Patent Number: 5,032,923
[45] Date of Patent: Jul. 16, 1991

[54] PRINTING CONTROL SYSTEM FOR FACSIMILE RECEIVER

[76] Inventors: Stephen Kurtin, 3835 Kingswood Rd.; Saul Epstein, 14558 Deervale Pl., both of Sherman Oaks, Calif. 91403

[21] Appl. No.: 539,873
[22] Filed: Jun. 18, 1990
[51] Int. Cl.⁵ .......................... H04N 1/23; H04N 1/21
[52] U.S. Cl. ..................... 358/296; 358/444
[58] Field of Search ................ 358/296, 401, 442, 444

[56] References Cited
U.S. PATENT DOCUMENTS 4,760,462  7/1988  Ogawa .......................... 358/296

*Primary Examiner*—Benjamin R. Fuller
*Assistant Examiner*—Scott A. Rogers
*Attorney, Agent, or Firm*—Saul Epstein

[57] ABSTRACT

A printing control system for a facsimile receiver of the type having a printhead which scans across the page and prints multiple lines of the facsimile image simultaneously. The system includes a first in-first out memory for storing incoming facsimile data which arrives more rapidly than the printing system can accommodate. The stored incoming data is transferred to one or more scan buffers as needed, and then sequentially to the printhead drivers.

11 Claims, 3 Drawing Sheets

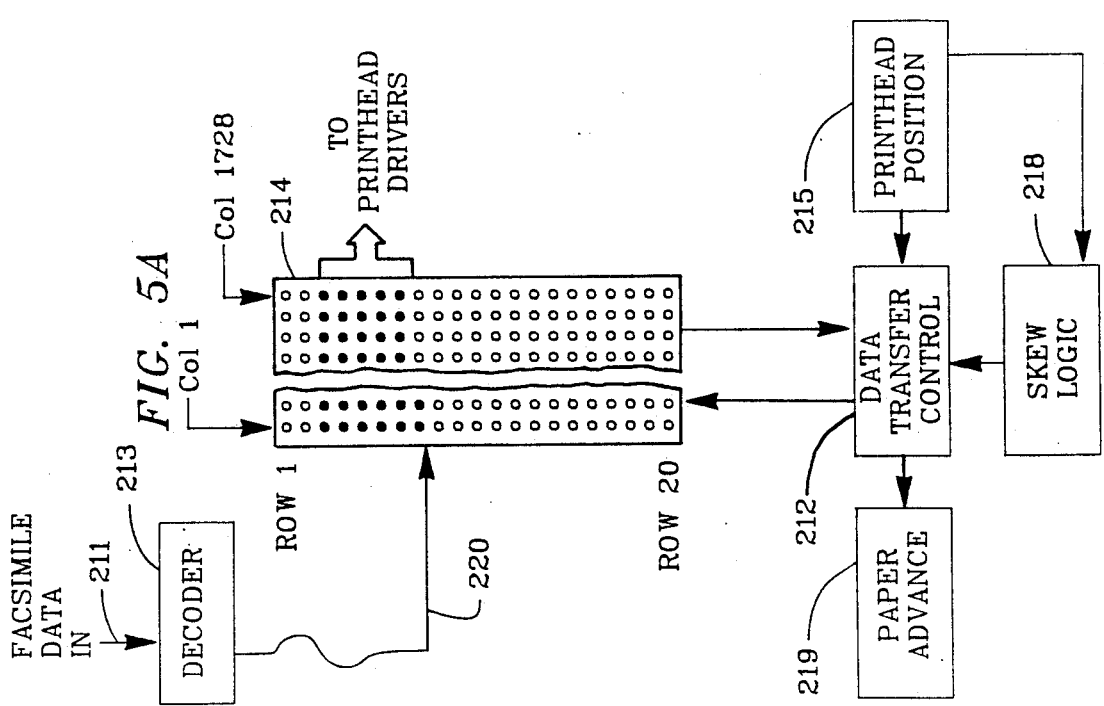

PRINTING CONTROL SYSTEM FOR FACSIMILE RECEIVER

BACKGROUND OF THE INVENTION

In a previously filed U.S. patent application, Ser. No. 338,330, the present inventors described a facsimile receiver which uses a "drop on demand" type of ink jet printhead to print facsimile images on plain paper. Printing on plain paper has obvious advantages over printing on thermal paper (which is the most common type of paper used in facsimile receivers), and the use of an ink jet type of printhead permits a receiver to be made at low cost. The printhead described in the previous application is one which has multiple ink jet nozzles arranged in two columns. Under electronic control, ejectors cause drops of ink to be ejected from these nozzles as needed to form the desired image. This arrangement results in a number of rows or lines of the facsimile image being printed simultaneously as the printhead scans across the page. Since facsimile signals are received in serial fashion and the printhead inherently utilizes a parallel data format, a certain amount of buffer memory and logic are necessary to allow the printhead ink ejectors to be driven.

So long as the printhead scanning speed is sufficient to print an image corresponding to the incoming facsimile data at least as fast as the data arrives (on average), the design of appropriate memory/logic systems is relatively straightforward. For example, two memory banks could be used as buffers between the incoming data stream and the printhead. These memory banks, called "scan buffers", should each be capable of storing the data for one scan of the printhead. Using this configuration, as the printhead scans across the page, one of the scan buffers outputs previously received data to the printhead ejector drivers, while the other accepts current incoming data. Before the second scan buffer is full, the printhead will have completed its travel across the page and be ready to start back to print the next group of lines. The printhead pauses until the second scan buffer is full, and then starts back across the page. On this pass of the printhead, the two scan buffers change places, the second outputting its data to the ejector drivers while the first is receiving data corresponding to the next scan. This alternating of scan buffers continues until the facsimile image is complete.

If the speed of scanning is slower than the rate of incoming data, the situation is not so simple. Under such conditions, the printhead will still be engaged in its first scan across the page after all of the data has been received for the second. Since facsimile data are transmitted continuously, data for the third scan of the printhead will be arriving while the printhead is still printing on its first scan. Therefore, the arriving data for the third scan, which should be stored in the scan buffer which is at that time outputting its contents to the printhead (and hence is not available to receive data), will be lost.

The present invention provides a system for handling incoming facsimile data which obviates the possibility of data loss.

SUMMARY OF THE INVENTION

The system of the present invention is particularly well suited to control the printing of facsimile images received by facsimile receivers of the type using printheads which scan across the page being printed, and which print a plurality of lines of facsimile image data simultaneously. Such a receiver is described in the previously filed U.S. patent application referred to above. The most popular standard presently in use for the transmission and reception of facsimile signals is that defined by the Consultive Committee for Telephone and Telegraph, known as CCITT Group 3 facsimile signals (CCITT Recommendation T.4). Hence the present invention will be described in connection with a facsimile receiver receiving CCITT Group 3 signals according to Recommendation T.4.

CCITT Group 3 facsimile signals are an electronic representation of a scanned image, where the data for each line of the image has been coded for more efficient transmission, and transmitted in digital form. The time of transmission of data representing each line of the image varies depending on the complexity of the image along the line. The applicable CCITT document (Recommendation T.4) provides for several optional minimum times of transmission, but the standard is 20 milliseconds. Under this standard, if there are few or no color changes along the line, the data for that line may be transmitted in as little as 20 milliseconds. An all black or all white page, therefore, will be transmitted at the rate of 20 milliseconds per line, or about 21.5 seconds per 11 inch page. Most images are more complex than all black or all white, and will ordinarily take more than the minimum time to transmit. It is nevertheless necessary to design facsimile receivers to accommodate very simple images which may be received in or near the minimum time.

According to a first embodiment of the invention, a relatively slow printhead scan speed can be accommodated by providing a first in-first out (FIFO) memory on the input data stream to temporarily hold data which arrives too fast to be utilized by the printing system. Data is fed into the FIFO at the rate it arrives over the telephone line, and is fed out to a scan buffer as one becomes available to receive data. Either one or two scan buffers can be used in the system. Excess received data is stored in the FIFO until space in a scan buffer becomes available to receive it.

In accordance with the first embodiment of the invention, each transfer of data to a scan buffer transfers enough data to permit printing of all of the lines of which the printhead is capable on the subsequent scan of the printhead. If, when the printhead finishes a scan across the page, sufficient data has not arrived over the telephone line, the printhead pauses and waits until the data has been received before starting the next scan. If sufficient data to print all lines of the next scan arrives before the printhead completes the previous scan, the signal to start a new scan is given as soon as the previous scan is completed.

The FIFO memory is preferably located so that it holds undecoded facsimile data in the form that it arrives over the telephone line, but it could be located after the decoding circuitry, if desired. The incoming facsimile data, whether in coded or decoded form, is fed to the FIFO memory as it is received. The data is stored in the FIFO memory until a scan buffer becomes available to receive data (at the end of each printhead scan). The stored data for one scan of the printhead is then transferred to the available scan buffer. Under some conditions, i.e., when the printing mechanism is able to keep up with the incoming data stream, the incoming data is fed out of the FIFO to a scan buffer as fast as it arrives at the FIFO, and virtually no data is stored in the FIFO. When the printing mechanism is not able to keep up with the incoming data stream, substantial data storage in the FIFO may be experienced. The size of the FIFO needed depends on the speeds of the printer and of data reception.

As an example, if a particular design of facsimile printer of the type described in U.S. patent application Ser. No. 338,330 could print an 8.5 by 11 inch sheet in 25 seconds, the capability of storing up to 3.5 seconds of facsimile data in the FIFO memory would have to be provided, assuming Group 3 standard transmission. This is because a Group 3 facsimile signal may be transmitted in as short as 20 milliseconds per line, and an 11 inch page contains 1075 lines (assuming standard mode transmission). Hence, the transmitted facsimile signal for a full 8.5 by 11 inch page may take as little as 21.5 seconds. When the data corresponding to a full page has been received at the receiver, then, the printer may be as much as 3.5 seconds away from completion of its printing task. It will be appreciated that under commonly used facsimile transmission protocols, there is sufficient time between the end of transmission for one page and the start of transmission for the next that the printing can be completed, and the FIFO emptied.

A second embodiment of the invention utilizes a FIFO memory and either one or two scan buffers as described for the first embodiment. However, the timing of the transfer of data from the FIFO to the scan buffers, as well as the operation of the printhead shuttle, differ. In the second embodiment, during or after each scan of the printhead across the page, the number of full lines of data then stored in the FIFO is determined, and the corresponding data is transferred to a scan buffer, either between scans of the printhead or, if two scan buffers are used, during the last part of a scan. When the printhead reaches the end of its travel across the page, it does not stop and wait for a signal to begin a new scan, it immediately reverses direction and starts a new scan irrespective of the amount of data which had arrived during the previous scan. On this scan, the scan buffer which has just received new data outputs that data to the printhead drivers. Only the number of lines of the image are printed which correspond to the number of lines of data then stored in the scan buffer. At the end of a printhead scan, the paper is advanced a distance equal to the space occupied by the number of lines printed.

A third embodiment of the invention is similar to the second in that a continuously reciprocating printhead is used. However no separate FIFO is required in this embodiment because the scan buffer itself serves the function of storing facsimile image data until it can be printed by the printing system. In this embodiment, incoming facsimile data is decoded and stored in the scan buffer as it arrives. On each scan of the printhead across the page, data corresponding to all of the full lines of image data then stored in the scan buffer (up to the maximum number of lines which can be printed) are sequentially output to the printhead drivers.

BRIEF DESCRIPTION OF THE DRAWINGS

FIGS. 5A, B, and C depict the operation of a third embodiment of the invention, in simplified block diagram form.

DETAILED DESCRIPTION OF THE INVENTION

Figure 1:
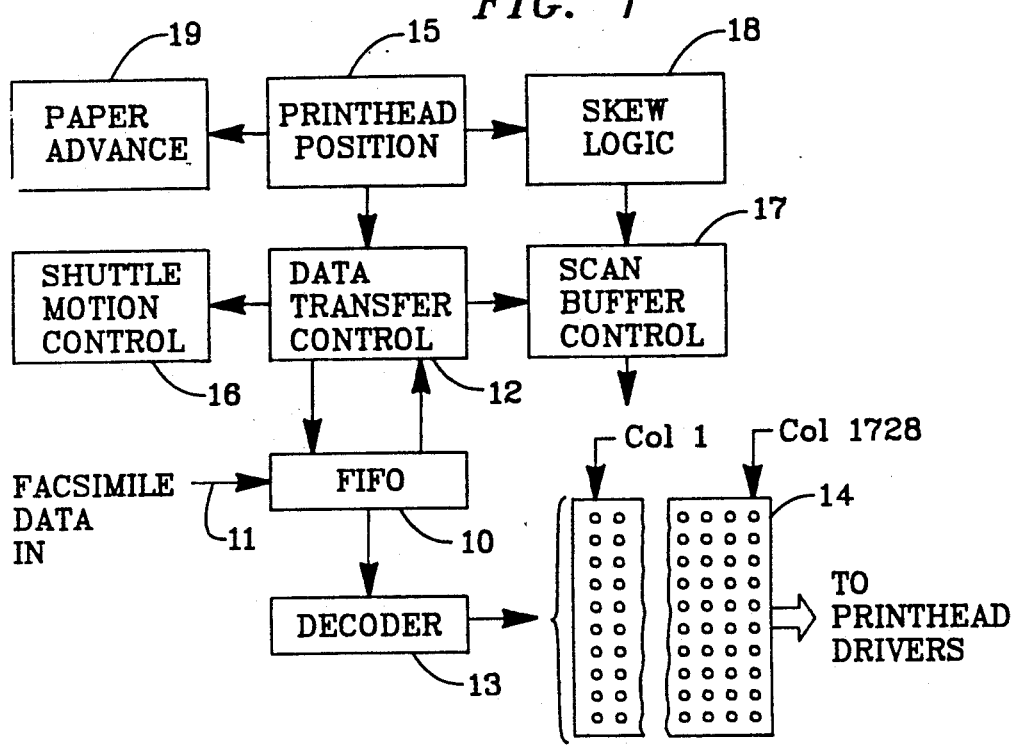
FIG. 1 is a simplified block diagram of a first embodiment of the present invention.

FIG. 1 depicts a simplified control system block diagram of a first embodiment of the present invention. The printhead shuttle in this first embodiment is used in a "single scan" mode. That is, after each scan of the printhead across the page, the printhead stops until a new scan is initiated by a signal from the control system. If the facsimile data is being received rapidly, the signal to initiate a new scan may be given as soon as the printhead completes its previous scan so that the printhead is, for practical purposes, continuously running. If, on the other hand, data is being received slowly, the printhead may have to wait a significant amount of time for the data corresponding to the next scan to arrive before a new scan is initiated. The second and third embodiments of the invention described below utilize a continuously running shuttle. In these embodiments, the printhead scans the page continuously without pausing, irrespective of the amount of facsimile data that has arrived. In all embodiments it is preferred that the printing be "bidirectional" in that after printing a segment of the image in a left to right scan, the next segment is printed as the printhead returns to the left side of the paper. "Unidirectional" printing wherein the printhead prints only left to right or right to left is also possible. In the following description it is assumed that bidirectional printing is used.

The invention as described below involves the use of electronic memories of the type usually called "random access memory" or RAM. Data is stored in such memories in cells at electronic locations which are called "addresses". Data is entered into or retrieved from the memory cells by "addressing" the desired cell and issuing an instruction to either read or write, as appropriate. There is not necessarily a fixed relationship between an address and the physical location of the corresponding memory cell. For explanatory purposes and ease of visualization of the principles of the invention, the memories are shown in the drawings as though they consist of arrays of cells physically arranged in rows and columns corresponding to the scanned lines of a section of the facsimile image being transmitted. It should be understood that the physical locations of the cells may be wholly different from what is portrayed in the drawings, and that the drawings are arranged as they are only to provide an easy way of conceptualizing the operation of the system. It is contemplated that, in actual systems, memory cells will be accessed by addresses which are generated and manipulated by methods well known to practitioners of the art.

In the first embodiment of the invention to be described, facsimile data is received over line 11 and is entered into FIFO (first in-first out) memory 10 as it arrives. The data remains stored in the FIFO until it can be utilized by the printhead, at which time the amount of data corresponding to the image to be printed on the next scan of the printhead is transferred out of the FIFO and into the scan buffer 14 (after being decoded in decoder 13). Data in excess of the amount transferred to the scan buffer is retained in the FIFO until the print cycle on which it is to be used arrives.

The scan buffer contains a number of memory locations equal to the maximum number of lines which can be printed by the printhead on one pass across the page times the number of pixels on each line of the facsimile image. For convenience in illustration and explanation it is assumed that the printhead used in connection with the systems illustrated in this specification can print 10 lines per scan, and that a facsimile signal which contains 1728 pixels per line is to be received. The scan buffer 14 therefore is shown as being a 10 by 1728 memory array. In the embodiment depicted in FIG. 1, ten lines of facsimile image data are transferred to scan buffer 14 just prior to each print cycle.

A print cycle (one scan of the printhead across the page) starts with a signal from the data transfer control unit 12 to the shuttle motion control unit 16 to start the printhead moving across the page. This signal is given when two conditions obtain: (1) the printhead is at a "home" position at one side of the page, and (2) the transfer of data from FIFO memory 10 to scan buffer 14 has been completed. The data transferred to the scan buffer is data which corresponds to the image segment to be printed on the immediately following scan of the printhead. Data transfer control unit 12 monitors both the printhead position encoder 15 and the transfer of data to the scan buffer from FIFO 10 to determine when a print cycle start signal is appropriate.

As the printhead scans across the page, scan buffer control unit 17, in response to signals from printhead position encoder 15, causes the data stored in the scan buffer to be output sequentially to the printhead ejector drivers. The dot forming elements of the printhead may not be physically aligned vertically with respect to the paper (and in the system described in application Ser. No. 338,330, they are not). Therefore, skew logic unit 18 may be used to selectively delay the outputting of data to the respective printhead drivers so that image pixels which should be vertically aligned will be printed in vertical alignment. When all of the data in scan buffer 14 has been printed, the paper is advanced by a distance equal to the height of the image just printed. The paper advance is initiated by a signal from the data transfer control unit to the paper advance circuit 19.

After the printhead has completed its scan across the page and has arrived at its home position, the printhead pauses to allow data for the next scan to be transferred from the FIFO to the scan buffer. This data is the data corresponding to the next group of lines of the image to be printed. When the transfer is completed, the conditions for the start of a print cycle will exist, and another print cycle will be initiated. This process continues until the entire image is printed.

Figure 2:
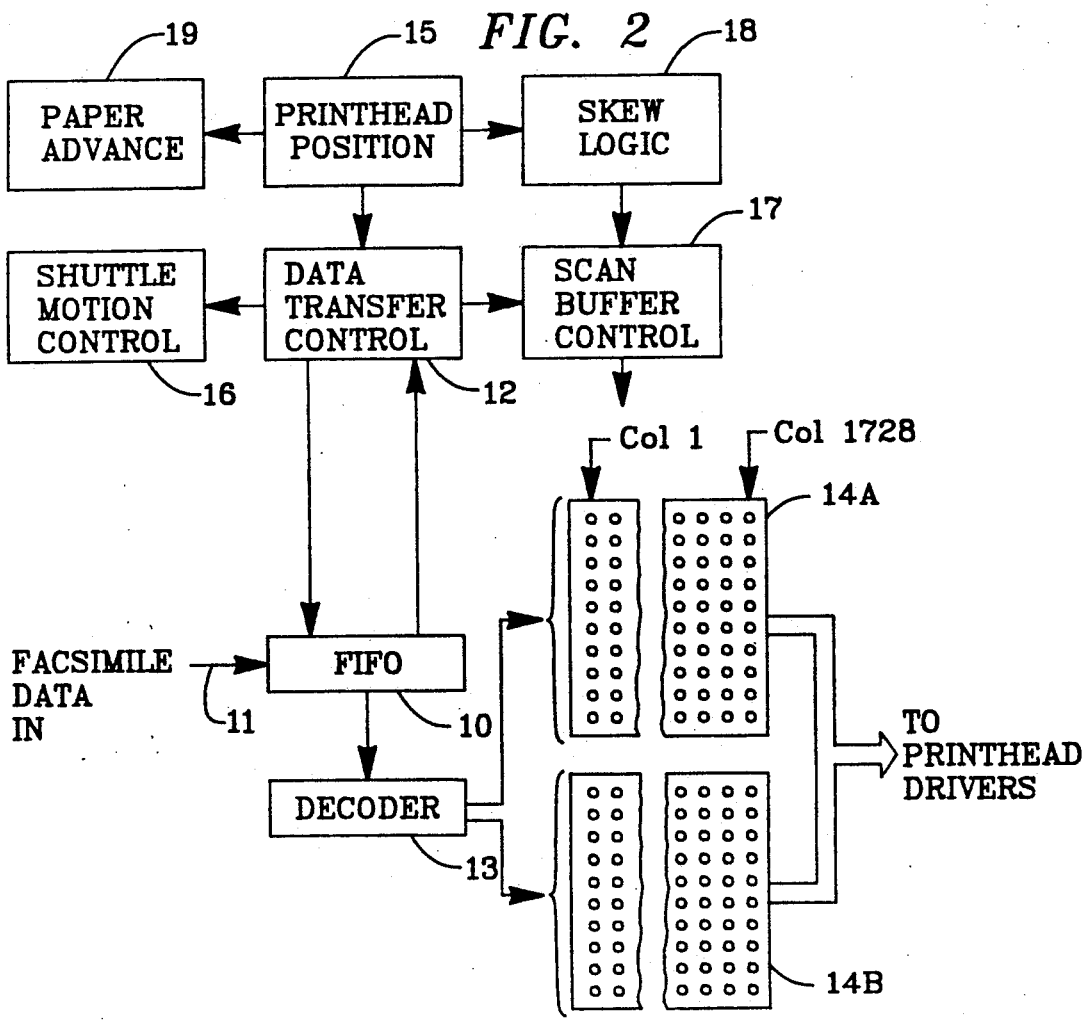
FIG. 2 is a simplified block diagram of a variant of the first embodiment of the present invention.

A variant of the embodiment of the invention just described utilizes two scan buffers (14A and 14B) rather than only one as shown in FIG. 1. A simplified block diagram of this variant is shown in FIG. 2. In this variant, while one of the scan buffers is outputting data to the printhead drivers, the other is accepting new data from FIFO 10. Hence, instead of the data transfer taking place while the printhead is at its home position, to the extent that the incoming data stream is ahead of the printing (i.e., that FIFO 10 is storing a significant amount of facsimile image data) much or all of the transfer can take place during the printhead scan. In other words, while the printhead is scanning across the page and printing a segment of the facsimile image with data from scan buffer 14A, scan buffer 14B is being filled with data corresponding to the segment of the image to be printed on the following scan of the printhead. The data being entered into scan buffer 14B is data transferred from FIFO 10, i.e., facsimile data previously received over line 11 and temporarily stored in FIFO 10. The data transferred, as before, is decoded in decoder 13 prior to being entered into the scan buffer. If the facsimile data is being received rapidly, scan buffer 14B is likely to be filled before the printhead has completed its scan across the page. If so, the print cycle start signal is given as soon as the printhead arrives in its home position. If the segment of the facsimile image to be printed on the next scan contains lines which involve many color reversals, the data arrival may be slow, and the transfer to the scan buffer may not be completed until after the printhead has arrived at its home position. In that case, the print cycle start signal is not given until the data transfer is complete.

Figure 3:
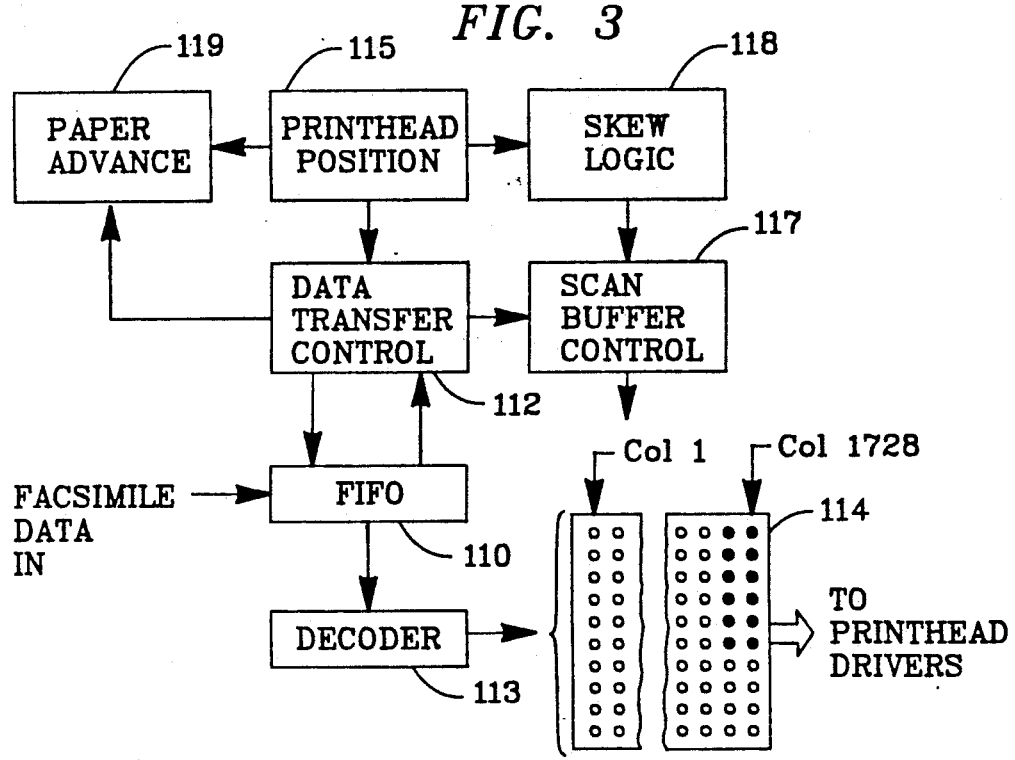
FIG. 3 is a simplified block diagram of a second embodiment of the present invention.

In a second embodiment of the invention, no signal to start a print cycle is used since in this embodiment the printhead continuously scans back and forth across the page, not waiting for a signal to begin its scan. A simplified block diagram of the system control circuitry of this embodiment is shown in FIG. 3. As in the first embodiment described, it is assumed that the printhead used is capable of printing 10 lines of pixels on each pass across the page. For illustrative purposes, memory cells containing data yet to be printed are shown as filled circles while those cells not containing current data are shown as empty circles. The condition illustrated in FIG. 3 is the situation which exists when the printhead is nearly finished with a scan across the page. As shown in FIG. 3, the data in columns 1727 and 1728 remain to be output from the scan buffer. The outputting of scan buffer data to the printhead drivers is under the control of scan buffer control 117, which is responsive to the printhead position encoder 115. Skew logic unit 118 has the same function as the skew logic unit 18 of the first described embodiment. For simplicity, the effect on ink jet ejection timing produced by skew logic unit 118 is omitted in the figure.

When the printhead reaches the end of one scan across the page (as detected by printhead position encoder 115) and is in process of being reversed to make another scan across the page in the opposite direction, the data transfer control unit 112 causes data corresponding to full lines of facsimile image information in FIFO 110 to be transferred to the scan buffer 114 (through decoder 113). As many full lines of data as can be accommodated by the scan buffer are transferred. If more lines of facsimile data are stored in the FIFO than the capacity of the scan buffer, the excess are not transferred, but are retained in the FIFO. Any fractional lines of data in the FIFO are also retained. It will be appreciated that it is necessary for the data transfer to the scan buffer be completed before the printhead has completed its reversal and has started the next scan across the page. FIG. 3 illustrates a case in which only six full lines of data were being stored in FIFO 110 at the time the previous scan of the printhead was completed.

After the data contained in column 1728 of scan buffer 114 has been printed, and while the printhead is reversing its direction of travel preparatory to another scan across the page, printhead position encoder 115 sends a signal to paper advance 119 to advance the paper. The paper is advanced by the number of lines printed on the just completed pass of the printhead, in this case six lines. The number of lines to advance the paper is controlled by a signal from data transfer control unit 112 to the paper advance circuit at the time data is transferred from the FIFO to the scan buffer.

Figure 4:
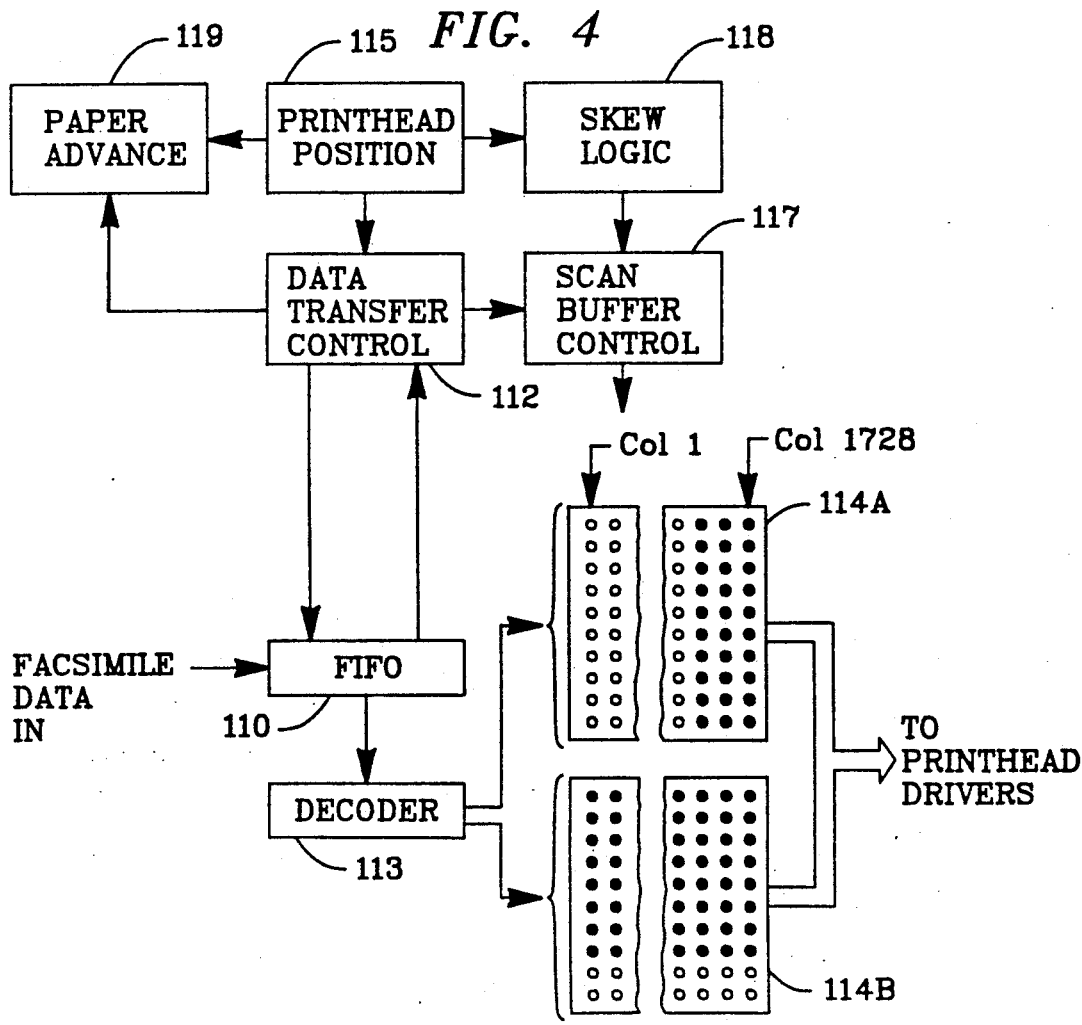
FIG. 4 is a simplified block diagram of a variant of the second embodiment of the present invention.

A variant similar to that described in connection with the first embodiment, namely the use of two scan buffers is also possible with the second embodiment of the invention. This variant is illustrated in FIG. 4. Scan buffers 114A and 114B are used, each receiving data and outputting the received data on alternate scans of the printhead. In this variant, more time is available to transfer data from the FIFO to the scan buffer than was available in the system depicted in FIG. 3.

At some point prior to, but preferably near the end of the travel of the printhead across the page, data transfer control unit 112 causes data corresponding to full lines of facsimile image information in FIFO 110 to be transferred to the scan buffer (114A or 114B) which is not at that time outputting data to the printhead drivers. As many full lines of data as can be accommodated by the scan buffer are transferred. If more lines of facsimile data are stored in the FIFO than the capacity of the scan buffer, the excess are not transferred, but are retained in the FIFO. Any fractional lines of data in the FIFO are also retained. At the moment depicted in FIG. 4, scan buffer 114B has just received the FIFO data. FIG. 4 illustrates a case in which when the transfer signal was received by the FIFO only eight full lines of data were being stored. Since scan buffer 114A contains 10 lines of data (in columns 1726–1728), it follows that when the previous transfer of data from FIFO 110 to the scan buffer 114A was made, FIFO 110 contained ten or more full lines of facsimile data, ten lines were therefore transferred.

After the data contained in column 1728 of scan buffer 114A has been printed, and the printhead is reversing its direction of travel preparatory to another scan across the page, printhead position encoder 115 sends a signal to paper advance 119 to advance the paper. The paper is advanced by the number of lines printed on the just completed pass of the printhead, in this case ten lines. At the end of the next pass by the printhead (after scan buffer 114B has output its data) the paper will be advanced by eight lines. The number of lines to advance the paper is controlled by a signal from data transfer control unit 112 to the paper advance circuit at the time data is transferred from the FIFO to the scan buffer.

On alternate scans of the printhead, scan buffers 114A and 114B interchange functions, the one receiving new data on one scan and outputting that data on the next scan, and vice versa. Hence, on the scan following the one illustrated in FIG. 4, the printhead will print the data contained in scan buffer 114B (eight lines) and scan buffer 114A will receive new data from FIFO 110. This alternating of scan buffers continues until the page printing is completed. If the facsimile data is arriving at or near the maximum rate, the rate at which facsimile data arrives at the FIFO will likely be greater than the rate at which data can be transferred to the scan buffers. In such a case, each transfer to a scan buffer will be of the maximum number of lines the scan buffer can hold, and the excess will build up in the FIFO. When all of the data corresponding to a page to be printed has been received, there may be a reservoir of data left in FIFO 110. This data will be printed in sequence, as described above, while the inter-page handshaking between the transmitting and receiving facsimile machines is under way.

FIGS. 5A, B, and C depict yet another embodiment of the present invention. In this third embodiment of the invention, no separate FIFO memory is used, the scan buffer 214 itself effectively performing the function of storing facsimile data which arrives faster than can be printed. The third embodiment is similar to the second in that a continuously reciprocating printhead is used. The scan buffer, however, since it performs the functions of both a FIFO and a scan buffer, is of a different design. Scan buffer 214 is shown as having twenty rows of memory cells, but, as indicated below, the number required for a particular application will depend on the speed of the printhead shuttle relative to the incoming data.

Facsimile data arrives on line 211 and is decoded by decoder 213. As before, the decoding can be done before the data is stored or after it is retrieved, whichever is convenient. As shown in FIG. 5, the decoding is done prior to the data being stored in scan buffer 214. Line 220 in FIG. 5 points to the row of scan buffer 214 which is being addressed at the time depicted by the figure. The illustrative conventions used in the prior figures are continued in FIG. 5. FIG. 5A depicts a moment in time when the printhead is about to begin a scan across the page. The memory cells in rows three through seven of scan buffer 214 contain data corresponding to the next segment of the image to be printed, and row eight is in process of being filled. During the ensuing scan, data transfer control unit 212, which keeps track of the number of full lines of unprinted data in the scan buffer, causes the data in rows three through seven to be sequentially output to the printhead drivers which drive the ejectors associated with the dot forming elements of rows one through five of the printhead. The result is that a segment of the image five lines tall is printed. Skew logic unit 218 selectively delays the outputting of the data so that vertically aligned image elements are printed in vertical alignment.

At the end of the printhead scan, printhead position encoder 215 sends a signal to the data transfer control unit, which, in turn causes the paper advance 219 to advance the page by a distance equal to five lines of the printed image. The printhead does not pause at the end of its scan, but immediately reverses and makes another pass across the page.

FIG. 5B depicts the scan buffer 214 at the beginning of the next scan of the printhead. During the time of the scan just completed it can be seen that enough facsimile data was received to complete row eight and, in addition, rows nine through eighteen. Data is still being entered in row nineteen. It is assumed as noted before, that for purposes of the examples provided in this specification, the printhead is capable of printing ten lines of the image simultaneously. Consequently, since the scan buffer now contains more than ten lines of image data, data transfer control unit 212 causes ten image lines (from rows eight through seventeen) to be sequentially output to the printhead drivers. The data in full row eighteen and partially filled row nineteen are not output.

On the following scan, as depicted in FIG. 5C, rows eighteen through twenty, and one through three contain full lines of facsimile image data, and these are output. After the last row in the scan buffer is filled, the scan buffer is refilled starting at row one. The printing process as described continues until the complete page is printed. The size of the scan buffer needed depends on the relative speed of the printer. If the printer could take 3.5 seconds more to print a page than the minimum data transmission time, as in the example discussed in the Summary section of this specification, the scan buffer capacity will have to be at least about 175 lines of image data.

It will be appreciated that what has been disclosed herein can be adapted in various ways by those skilled in the art without departing from the essential characteristics of the invention. Such adaptations are intended to be encompassed within the scope of the claims.

We claim:

1. In a facsimile receiver printing system of the type which receives coded facsimile signals representative of an image to be reproduced, and which includes a printhead mounted for reciprocal scanning motion across a page, said printhead having a plurality of dot forming elements arranged whereby a plurality of lines of dots are formed during each scan of said printhead across said page, each of said dot forming elements being independently actuatable by an actuator, the improvement which comprises:

a first in-first out memory for storing received facsimile signals;
decoding means for decoding said received facsimile signals;
a scan buffer for storing decoded facsimile signals;
coupling means for coupling facsimile signals representing complete lines of dots to be printed from said first infirst out memory to said scan buffer;
means for sequentially coupling the signals stored in said scan buffer to said actuators; and
means responsive to printhead position for initiating the transfer of said signals from said first in-first out memory to said scan buffer.

2. The facsimile receiver improvement recited in claim 1 wherein at each transfer of signals from said first in-first out memory to said scan buffer, signals representing all of the complete lines of dots to be printed which are being stored in said first in-first out memory at the time of said transfer are transferred to said scan buffer, up to the capacity of said scan buffer.

3. The facsimile receiver improvement recited in claim 2 wherein the transfer of said signals from said first in-first out memory to said scan buffer takes place between scans of said printhead across said page.

4. The facsimile receiver improvement recited in claim 2 wherein said facsimile receiver includes two of said scan buffers, and said transfer of said signals to said scan buffer takes place at least partially during the motion of said printhead across said page, said signals being transferred to said two scan buffers alternately, on alternate scans of said printhead across said page.

5. A method of printing using a printhead of the type which is mounted for reciprocal scanning motion across a page, said printhead having a plurality of dot forming elements arranged whereby a plurality of lines of dots are formed during each scan of said printhead across said page, each of said dot forming elements being independently actuatable by an actuator, the method comprising:

receiving input signals in serial sequence representing dots to be printed along said lines;
storing signals derived from said input signals in a scan buffer memory;
causing said printhead to reciprocally scan across said page in a continuous manner; and
prior to the start of each scan of said printhead, when said printhead passes a predetermined position, sequentially coupling to said actuators the signals corresponding to all of the full lines of dots to be printed which are stored in said scan buffer memory, but not more than the number of lines of dots which can be printed by said printhead on one pass of said printhead across the page.

6. The method of printing recited in claim 5 and further including the steps of storing said received input signals in a first in-first out memory; and
periodically coupling signals derived from said input signals stored in said first in-first out memory to said scan buffer memory, the signals coupled to said scan buffer memory during each coupling of signals from said first in-first out memory to said scan buffer memory corresponding to full lines of dots to be printed, each of said periodic couplings occurring after the dots corresponding to all previous signals coupled to said scan buffer memory have been printed.

7. The method of printing recited in claim 6 wherein the signals coupled from said first in-first out memory to said scan buffer memory are coupled to and stored in two scan buffer memories alternately, said signals being coupled to one of said scan buffer memories while signals previously stored in the other of said scan buffer memories are being coupled to said actuators.

8. A method of printing using a printhead of the type which is mounted for reciprocal scanning motion across a page, said printhead having a plurality of dot forming elements arranged whereby a plurality of lines of dots are formed during each scan of said printhead across said page, each of said dot forming elements being independently actuatable by an actuator, the method comprising:

receiving input signals in serial sequence representing dots to be printed along said lines;
storing said received input signals in a first in-first out memory;
prior to the start of each scan of said printhead across said page, and responsive to the position of said printhead, coupling signals derived from said input signals stored in said first in-first out memory to a scan buffer memory, the signals coupled to said scan buffer memory during each coupling of signals from said first in-first out memory to said scan buffer memory corresponding to full lines of dots to be printed; and
during each scan of said printhead across said page, sequentially coupling the signals which are stored in said scan buffer memory to said actuators.

9. The method of printing recited in claim 8 and further including the step of causing said printhead to reciprocally scan across said page in a continuous manner.

10. The method of printing recited in claim 8 wherein the signals coupled from said first in-first out memory to said scan buffer memory are coupled to and stored in two scan buffer memories alternately, said signals being coupled to one of said scan buffer memories while signals previously stored in the other of said scan buffer memories are being coupled to said actuators.

11. The method of printing recited in claim 10 and further including the step of causing said printhead to reciprocally scan across said page in a continuous manner.

* * * * *